United States Patent
Murad et al.

(10) Patent No.: US 10,471,785 B1
(45) Date of Patent: Nov. 12, 2019

(54) SYSTEM AND METHOD FOR MONITORING A CONNECTION BETWEEN A FIFTH WHEEL AND A TOWED VEHICLE

(71) Applicant: GM GLOBAL TECHNOLOGY OPERATIONS LLC, Detroit, MI (US)

(72) Inventors: Mohannad Murad, Troy, MI (US); Bryan W. Fowler, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/138,189

(22) Filed: Sep. 21, 2018

(51) Int. Cl.
| | |
|---|---|
| B60D 1/28 | (2006.01) |
| B60W 50/14 | (2012.01) |
| B60W 10/18 | (2012.01) |
| B60D 1/01 | (2006.01) |

(52) U.S. Cl.
CPC ............... *B60D 1/28* (2013.01); *B60D 1/015* (2013.01); *B60W 10/18* (2013.01); *B60W 50/14* (2013.01); *B60W 2050/143* (2013.01); *B60W 2050/146* (2013.01); *B60W 2300/14* (2013.01); *B60W 2520/10* (2013.01)

(58) Field of Classification Search
CPC ............................... H04W 4/00; B60W 10/00
See application file for complete search history.

(56) References Cited

U.S. PATENT DOCUMENTS

| | | | | |
|---|---|---|---|---|
| 8,976,246 | B1* | 3/2015 | Rappuhn | B60D 1/62 348/148 |
| 2006/0214506 | A1* | 9/2006 | Albright | B60T 7/20 303/123 |
| 2010/0109368 | A1* | 5/2010 | Marshall | B62D 33/0273 296/57.1 |
| 2013/0297154 | A1* | 11/2013 | Burchett | B62D 35/001 701/49 |
| 2014/0172232 | A1* | 6/2014 | Rupp | B60W 30/18036 701/36 |

* cited by examiner

*Primary Examiner* — Shirley Lu
(74) *Attorney, Agent, or Firm* — Cantor Colburn LLP

(57) ABSTRACT

A method of monitoring an attachment between a towing vehicle and a towed vehicle includes determining that a first attachment element on the towed vehicle is not coupled to a second attachment element on the towing vehicle, receiving an indication that the towing vehicle is moving, and activating at least one of a towing vehicle brake system, a visual alert system, and an audible alert system.

16 Claims, 5 Drawing Sheets

SYSTEM AND METHOD FOR MONITORING A CONNECTION BETWEEN A FIFTH WHEEL AND A TOWED VEHICLE

INTRODUCTION

The subject disclosure relates to the art of vehicles and, more particularly, to a system and method for monitoring a connection between a fifth wheel on a vehicle and a towed vehicle.

Certain vehicles, such as semi-trailers employ a fifth wheel coupling to tow a vehicle, such as a trailer. Other vehicles, such as pickup trucks, may use a fifth wheel coupling to tow a vehicle in lieu of a frame hitch. For example, a fifth wheel coupling may be used by a pickup truck to tow larger vehicles such as recreational vehicles, trailers and the like. A fifth wheel coupling typically includes a king pin or steel pin that may project from the towed vehicle and a horseshoe shaped coupling device that may be arranged at a rear of the towing vehicle. The king pin connects with the horseshoe shaped coupling device (fifth wheel) to join the towing vehicle and the towed vehicle.

If the king pin is not properly connected with the fifth wheel, and the towing vehicle moves forward, damage may occur to a bed of the truck and or to a tailgate of the truck. Some fifth wheel couplings include visual indicators at the fifth wheel. The visual indicators provide feedback that the king pin is connected. Current systems do not provide feedback to a driver in the towing vehicle. Accordingly, the industry would be receptive of a system that provides feedback to drivers in a vehicle cockpit indicating an improper fifth wheel connection.

SUMMARY

In accordance with an aspect of an exemplary embodiment, a method of monitoring an attachment between a towing vehicle and a towed vehicle includes determining that a first attachment element on the towed vehicle is not coupled to a second attachment element on the towing vehicle, receiving an indication that the towing vehicle is moving, and activating at least one of a towing vehicle brake system, a visual alert system, and an audible alert system.

In addition to one or more of the features described herein the method includes determining if a tailgate of the towing vehicle is in a closed position.

In addition to one or more of the features described herein the method includes opening the tailgate in response to a user input.

In addition to one or more of the features described herein the method includes overriding the towing vehicle brake system in response to a user input.

In addition to one or more of the features described herein determining that the first attachment element is not coupled to the second attachment element includes sensing a position of a switch operatively associated with the second attachment element.

In addition to one or more of the features described herein determining that the first attachment element is not coupled to the second attachment element includes evaluating an image of the first and second attachment elements captured by a camera.

In addition to one or more of the features described herein evaluating the image of the first and second attachment elements includes detecting a presence of a gap between the first attachment element and the second attachment element.

In addition to one or more of the features described herein evaluating the image includes evaluating a digital image of the second attachment element.

In addition to one or more of the features described herein evaluating the image includes evaluating a digital image of a connection sensor coupled to one of the first and second attachment elements.

In addition to one or more of the features described herein the method includes determining whether there is sufficient light to evaluate the image, and activating a bed light in the towing vehicle if there is insufficient light to evaluate the image.

In accordance with an aspect of an exemplary embodiment, a system for monitoring attachment of a towed vehicle to a towing vehicle includes a processor, and a non-volatile memory having stored thereon a set of instructions which, when executed by the processor, causes the system to determine that a first attachment element on the towed vehicle is not coupled to a second attachment element on the towing vehicle, receive an indication that the towing vehicle is moving, and activate at least one of a towing vehicle brake system, a visual alert system, and an audible alert system.

In addition to one or more of the features described herein the set of instructions, when executed by the processor, causes the system to: determine if a tailgate of the towing vehicle is in a closed position.

In addition to one or more of the features described herein the set of instructions, when executed by the processor, causes the system to open the tailgate in response to a user input.

In addition to one or more of the features described herein the set of instructions, when executed by the processor, causes the system to override the towing vehicle brake system in response to a user input.

In addition to one or more of the features described herein the set of instructions, when executed by the processor, causes the system to sense a position of a switch to determine that the first attachment element is not coupled to the second attachment element.

In addition to one or more of the features described herein the set of instructions, when executed by the processor, causes the system to evaluate an image captured by a camera to determine that the first attachment element is not coupled to the second attachment element.

In addition to one or more of the features described herein the set of instructions, when executed by the processor, causes the system to detect a presence of a gap between the first attachment element and the second attachment element when evaluating the image of the first and second attachment elements.

In addition to one or more of the features described herein the set of instructions, when executed by the processor, causes the system to evaluate a digital image of the second attachment element when evaluating the image.

In addition to one or more of the features described herein the set of instructions, when executed by the processor, causes the system to evaluate a digital image of a connection sensor arranged at the second attachment element when evaluating the image.

In addition to one or more of the features described herein the set of instructions, when executed by the processor, causes the system to determine whether there is sufficient light to evaluate the image, and activate a bed light in the towing vehicle if there is insufficient light to evaluate the image.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
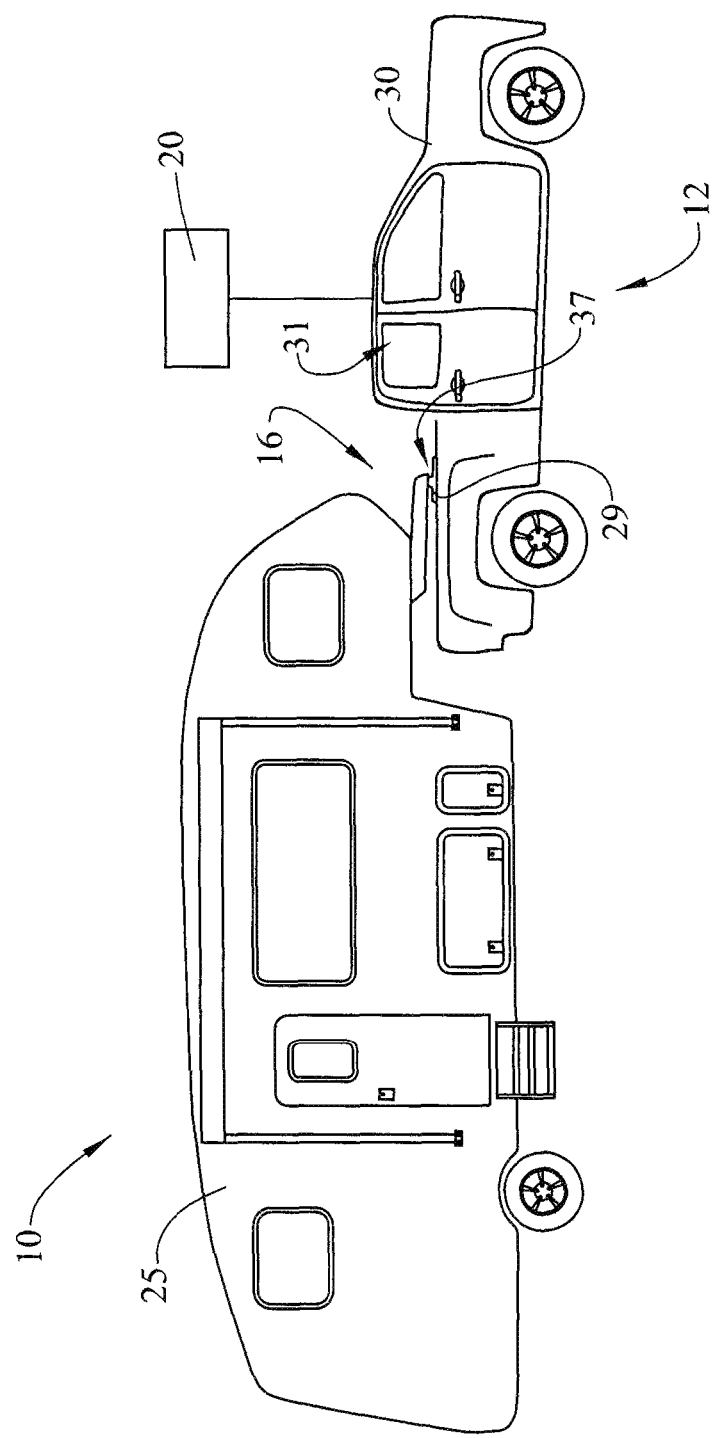
FIG. 1 depicts a towed vehicle coupled to a towing vehicle with a fifth wheel coupling and a fifth wheel monitoring system, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
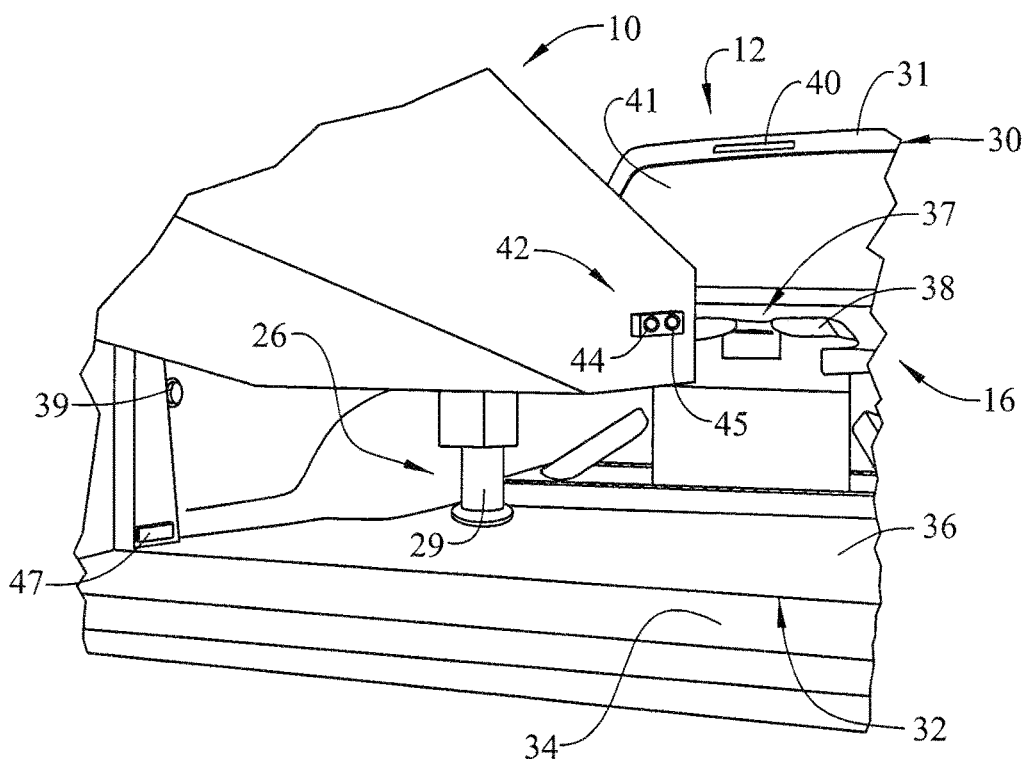
FIG. 2 depicts a king pin on the towed vehicle separated from a fifth wheel coupling on the towing vehicle.

With initial reference to FIGS. 1 and 2, a towed vehicle 10 is shown connected to a towing vehicle 12 through a fifth wheel coupling 16. In accordance with an exemplary embodiment, towing vehicle 12 includes a monitoring system 20 that provides feedback pertaining to the fifth wheel coupling 16. Monitoring system 20 selectively exercise control over towing vehicle 12 based on a status of fifth wheel coupled 16 as will be detailed herein.

Towed vehicle 10 may take the form of a recreational vehicle 25 having a first attachment element 26 which may take the form of a king pin 29. Of course, it should be understood that towed vehicle 10 may take on a variety of forms. Towing vehicle 12 may take the form of a pickup truck 30 having a passenger compartment 31, a bed 32 and a tailgate 34. Bed 32 includes a bed surface 36 that supports a second attachment element 37 which may take the form of a fifth wheel 38 that may receive king pin 29 to form fifth wheel coupling 16. At this point, it should be understood that king pin could be mounted to bed surface 36 and the fifth wheel could form part of towed vehicle 10. A bed light 39 may be arranged in bed 32 to provide desired illumination.

Pickup truck 30 includes a camera 40 arranged above a rear window 41 of passenger compartment 31. Camera 40 may be directed towards a fifth wheel indicator system 42.

Fifth wheel indicator system 42 may include a first light 44 and a second light 45 that indicates a status of fifth wheel coupling 16. For example, first light 44 may be a red light indicating that king pin 29 is not seated in fifth wheel 38. Second light 45 may be a green light indicating that king pin 29 is connected to fifth wheel 38. Pickup truck 30 may also include a tailgate position sensor 47 that detects whether tailgate 34 is in an open or a closed configuration.

Figure 3:
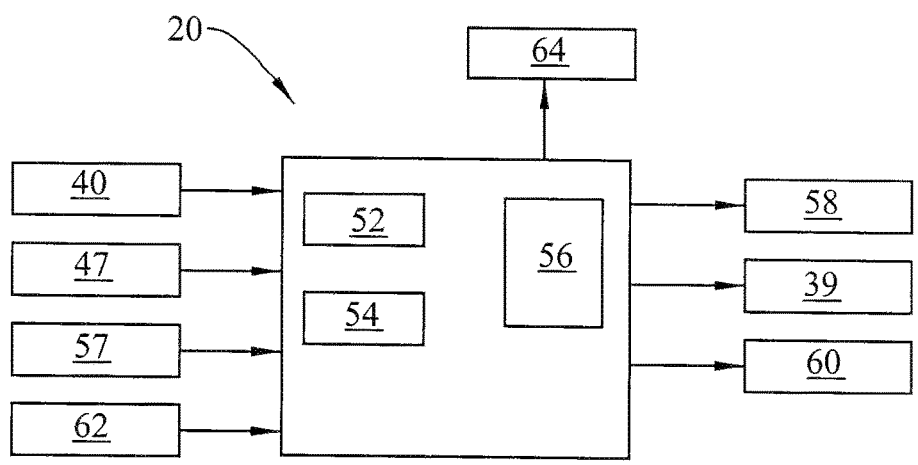
FIG. 3 depicts a block diagram illustrating a system for monitoring a fifth wheel connection between a towed vehicle and a towing vehicle, in accordance with an aspect of an exemplary embodiment.

Camera 40 and tail gate position sensor 47 are connected to monitoring system 20 as shown in FIG. 3. As also shown in FIG. 3, monitoring system 20 includes a processor 52 that may take the form of a central processing unit (CPU) or a graphics processing unit (GPU). Processor 52 is operatively connected to a non-volatile memory module 54 having stored thereon operating instructions as will be detailed herein. Monitoring system 20 may also include an imaging processing module 56 coupled to camera 40. Image processing module 56 evaluates images captured by camera 40. Monitoring system 20 may also be connected to a vehicle state sensor 57 that may provide an indication of vehicle gear position, vehicle speed, steering wheel angle and the like. Monitoring system 20 may also be coupled to a brake system 58 of towing vehicle 12, a tailgate actuator 60 that may selectively open tailgate 34, bed light 39, and a brake override switch 62. Monitoring system 20 may further be connected to an alert system 64 that could take on various forms including a visual alert system and/or an audible alert system.

Figure 4:
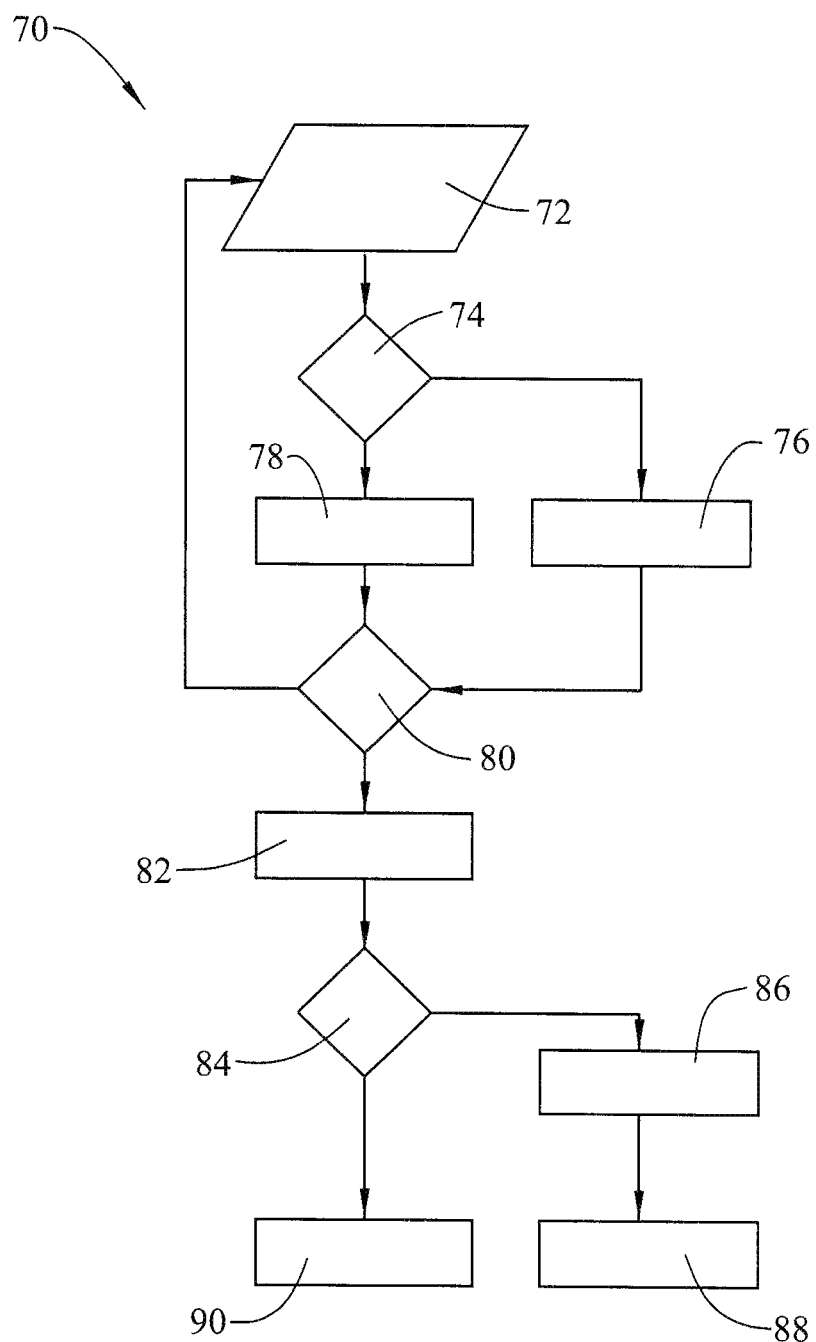
FIG. 4 depicts a flow chart illustrating a method of monitoring a fifth wheel coupling, in accordance with an exemplary aspect.

Reference will now follow to FIG. 4 in describing a method 70 of monitoring fifth wheel coupling 16 in accordance with an aspect of an exemplary embodiment. Method 70 may be embodied by the set of instructions stored in non-volatile memory module 54. In block 72, camera 40 is activated to capture an image of indicator system 42. In block 74, a determination is made whether there is sufficient light to capture the image of indicator system 42. If there is sufficient light, the image is captured, in block 76. If there is insufficient light, bed light 39 may be activated in block 78 and camera 40 may capture a fresh image.

In block 80, a determination is made whether king pin 29 is connected with fifth wheel 38. The determination may be made by evaluating the captured image of indicator system 42 or by detecting a gap between king pin 29 and fifth wheel 38. A determination is also made whether towing vehicle 12 is moving. Movement of towing vehicle may be detected through a variety of mechanisms including wheel sensors, transmission sensors, engine sensors and the like. If king pin 29 and fifth wheel 38 are not connected, and towing vehicle 12 is moving, monitoring system 20 activates brake system 58 in block 82. Monitoring system 20 may also provide a warning to an operator of towing vehicle 12 through alert system 64. The warning may include one or more of an audible warning and a visual warning.

In block 84, monitoring system 20 determines if tailgate 34 is in an up or closed position. If tailgate 34 is closed, monitoring system 20 provides the operator with an option to toggle tailgate actuator 60. If selected, tailgate actuator 60 opens tailgate 34 in block 86. In block 88, the operator is then provided with an option to select brake override switch 62 and release brake system 58. Similarly, if tailgate 38 is determined to be open in block 84, the operator is then provided with an option to select brake override switch 62 and release brake system 58 in block 90. In this manner, monitoring system 20 provide feedback to an operator of towing vehicle 12 that may prevent damage to tailgate 38 and or bed 32. That is, by preventing movement of towing vehicle 12 when fifth wheel coupling 16 is not connected, damage to bed surface 36 and/or tailgate 38 due to contacts with king pin 29 may be prevented.

Figure 5:
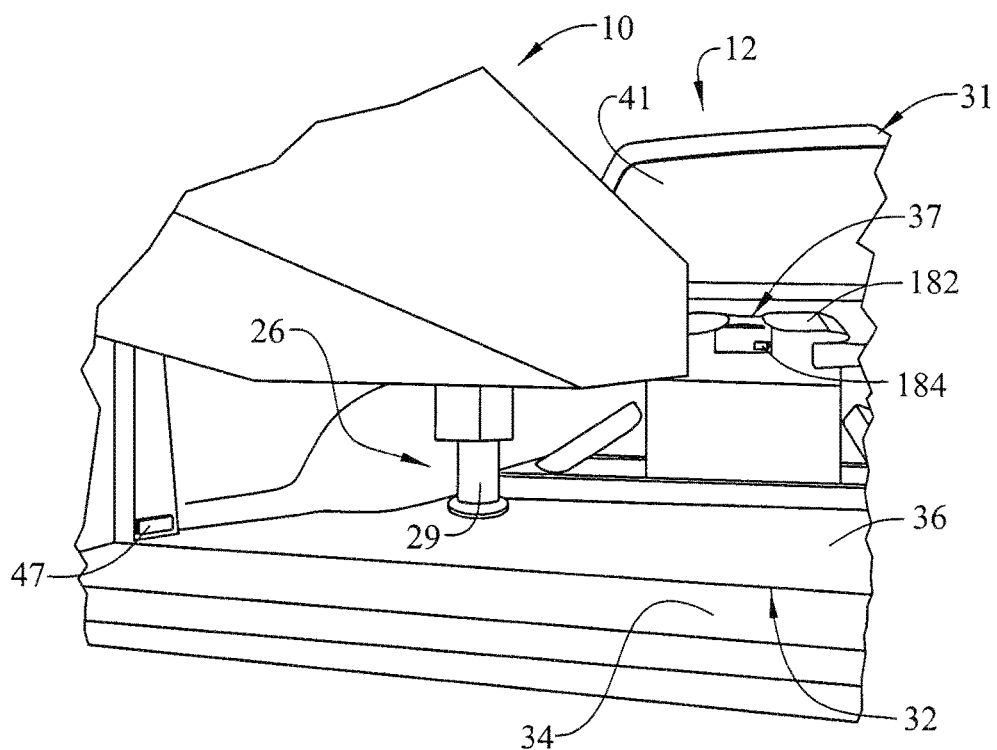
FIG. 5 depicts a towed vehicle coupled to a towing vehicle with a fifth wheel coupling and a fifth wheel monitoring system, in accordance with another aspect of an exemplary embodiment.
Figure 6:
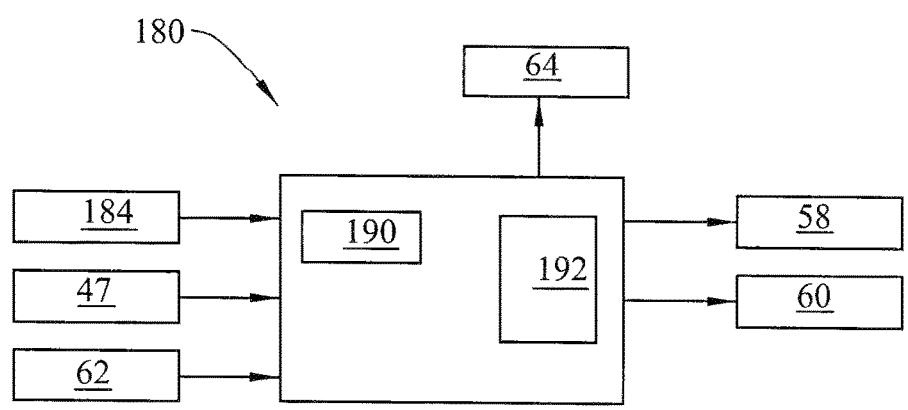
FIG. 6 depicts a block diagram illustrating a system for monitoring a fifth wheel connection between a towed vehicle and a towing vehicle, in accordance with an aspect of an exemplary embodiment.

Reference will now follow to FIG. 5 in describing a fifth wheel monitoring system 180 in accordance with another exemplary aspect. A fifth wheel 182 is shown mounted to bed surface 36. Fifth wheel 182 includes a switch 184 that may be toggled when king pin 29 is captured. That is, changing a position of switch 184 indicates a completed fifth wheel coupling. As shown in FIG. 6, monitoring system 180 is connected to switch 184, tailgate position sensor 47 brake system 58, tailgate actuator 60, alert system 64, and brake override switch 62. Monitoring system 180 includes a processor 190 and a non-volatile memory module 192 that stores a set of instructions.

Figure 7:
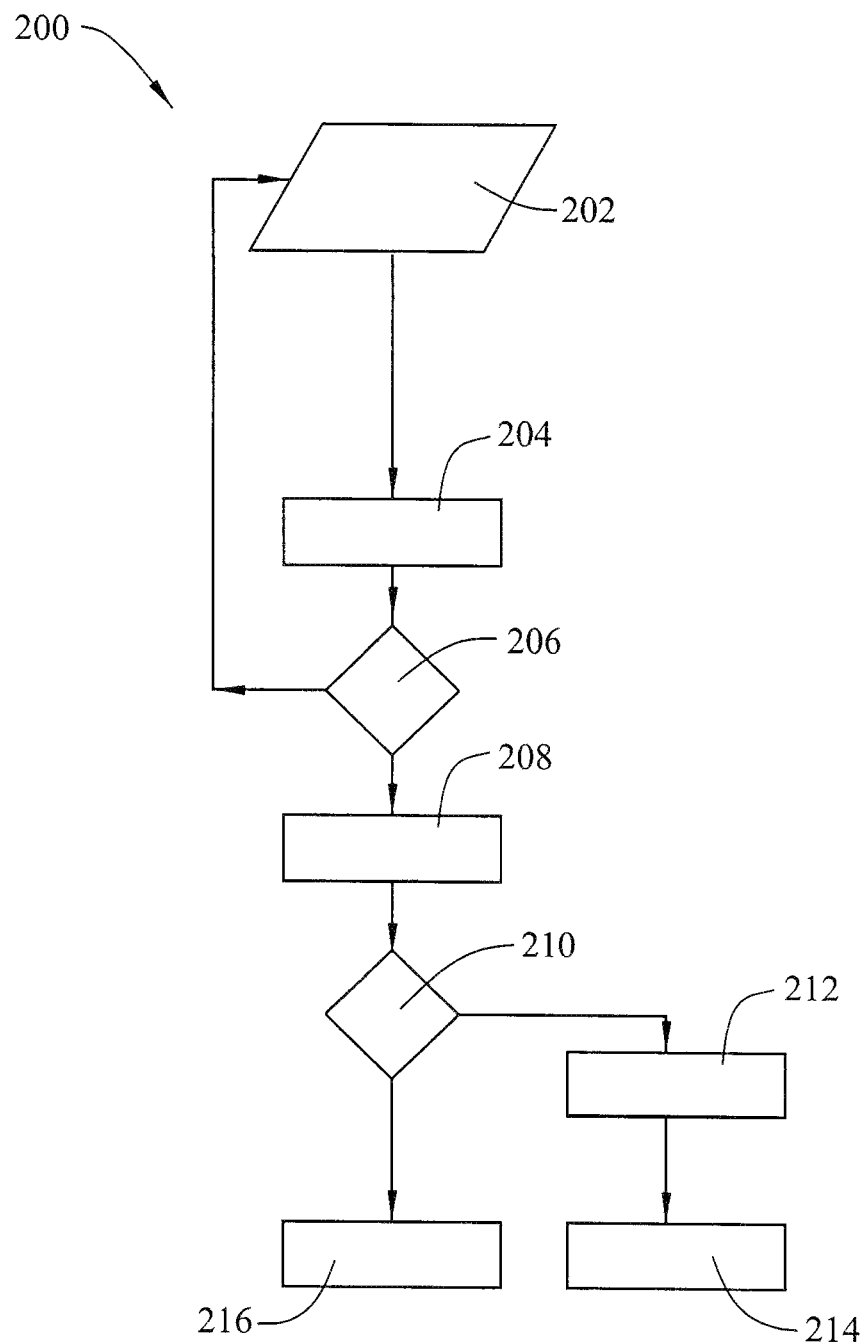
FIG. 7 depicts a flow chart illustrating a method of monitoring a fifth wheel coupling, in accordance with an exemplary aspect.

Reference will now follow to FIG. 7 in describing a method 200 of monitoring fifth wheel coupling in accordance with an aspect of an exemplary embodiment. Method 200 may be embodied by the set of instructions stored in non-volatile memory module 192. In block 202, a determination is made that towed vehicle 10 is being connected to towing vehicle 12. The determination may be based on a variety of factors including, weight on wheel sensors, proximity sensors and the like. In block 204, monitoring system 180 receives an indication that king pin 29 has engaged with fifth wheel 182. In block 206 a determination is made whether king pin 29 has disengaged from fifth wheel 182 and whether towing vehicle 12 is in motion. If king pin 29 has decoupled, and towing vehicle is in motion, monitoring system 180 activates braking system 58 in block 208.

In block 210, a determination is made whether tailgate 34 is open. If tailgate 34 is closed, an option is provided to the operator in block 212 to activate tailgate actuator 60. Tailgate actuator 60 opens tailgate 34 and, in block 214, the operator has an option to select brake override switch 62 and release brake system 58. Similarly, if tailgate 38 is determined to be open in block 210, the operator is then provided with an option to select brake over aide switch 62 and release brake system 58 in block 216.

In a manner similar to that described herein, monitoring system 180 provides feedback to an operator of towing vehicle 12 that may prevent damage to tailgate 38 and or bed 32. That is, by preventing movement of towing vehicle 12 when the fifth wheel coupling is not connected, damage to bed surface 36 and/or tailgate 38 due to contacts with king pin 29 may be prevented.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of monitoring an attachment between a towing vehicle and a towed vehicle comprising:
   determining that a first attachment element on the towed vehicle is not coupled to a second attachment element on the towing vehicle by evaluating, in an image processor, an image of the first and second attachment elements captured by a camera;
   receiving an indication that the towing vehicle is moving; and
   activating at least one of a towing vehicle brake system, a visual alert system, and an audible alert system.

2. The method of claim 1, further comprising determining if a tailgate of the towing vehicle is in a closed position.

3. The method of claim 2, further comprising opening the tailgate in response to a user input.

4. The method of claim 1, further comprising overriding the towing vehicle brake system in response to a user input.

5. The method of claim 1, wherein evaluating the image of the first and second attachment elements includes detecting a presence of a gap between the first attachment element and the second attachment element.

6. The method of claim 5, wherein evaluating the image includes evaluating a digital image of the second attachment element.

7. The method of claim 6, wherein evaluating the image includes evaluating a digital image of a connection sensor coupled to one of the first and second attachment elements.

8. The method of claim 1, further comprising:
   determining whether there is sufficient light to evaluate the image; and
   activating a bed light in the towing vehicle if there is insufficient light to evaluate the image.

9. A system for monitoring attachment of a towed vehicle to a towing vehicle, the system including a processor, and a non-volatile memory having stored thereon a set of instructions which, when executed by the processor, causes the system to:
   determine that a first attachment element on the towed vehicle is not coupled to a second attachment element on the towing vehicle by evaluating, in an image processor, an image of the first and second attachment elements captured by a camera;
   receive an indication that the towing vehicle is moving; and
   activate at least one of a towing vehicle brake system, a visual alert system, and an audible alert system.

10. The system of claim 9, wherein the set of instructions, when executed by the processor, causes the system to determine if a tailgate of the towing vehicle is in a closed position.

11. The system of claim 10, wherein the set of instructions, when executed by the processor, causes the system to open the tailgate in response to a user input.

12. The system of claim 9, wherein the set of instructions, when executed by the processor, causes the system to override the towing vehicle brake system in response to a user input.

13. The system of claim 9, wherein the set of instructions, when executed by the processor, causes the system to detect a presence of a gap between the first attachment element and the second attachment element when evaluating the image of the first and second attachment elements.

14. The system of claim 9, wherein the set of instructions, when executed by the processor, causes the system to evaluate a digital image of the second attachment element when evaluating the image.

15. The system of claim 9, wherein the set of instructions, when executed by the processor, causes the system to evaluate a digital image of a connection sensor arranged at the second attachment element when evaluating the image.

16. The system of claim 9, wherein the set of instructions, when executed by the processor, causes the system to:
   determine whether there is sufficient light to evaluate the image; and activate a bed light in the towing vehicle if there is insufficient light to evaluate the image.

* * * * *